United States Patent [19]

Tanaka et al.

[11] 4,376,856
[45] Mar. 15, 1983

[54] POLYETHER-ESTER AMIDE AND PROCESS FOR PREPARATION THEREOF

[75] Inventors: Chiaki Tanaka, Chita; Shinobu Nakashima, Nagoya, both of Japan

[73] Assignee: Toray Industries, Inc., Tokyo, Japan

[21] Appl. No.: 321,760

[22] Filed: Nov. 16, 1981

[30] Foreign Application Priority Data

Nov. 25, 1980 [JP] Japan ............... 55/164726

[51] Int. Cl.³ .................. C08G 69/08; C08G 69/44
[52] U.S. Cl. .................. 528/292; 525/419; 525/420; 528/301; 528/302
[58] Field of Search ............... 525/419, 420; 528/292, 528/297, 301, 302

[56] References Cited

U.S. PATENT DOCUMENTS

| | | | |
|---|---|---|---|
| 4,207,410 | 6/1980 | Burzin et al. | 528/288 |
| 4,218,549 | 8/1980 | Jadamus et al. | 525/420 |
| 4,230,838 | 10/1980 | Foy et al. | 525/408 |

FOREIGN PATENT DOCUMENTS

56-47430 10/1981 Japan.

Primary Examiner—Lucille M. Phynes
Attorney, Agent, or Firm—Austin R. Miller

[57] ABSTRACT

An improved polyether-ester amide is prepared by mixing (A) an aminocarboxylic acid, (B) a poly(alkylene oxide)glycol having a number-average molecular weight of 300 to 6,000 and (C) a dicarboxylic acid at such a mixing ratio that the amount of the component (B) is 5 to 90% by weight based on the total amount and the amino, carboxyl and hydroxyl groups in the mixture satisfy the following requirement:

$$0.95 \leq [COOH]/([NH_2]+[OH]) \leq 1.05$$

heating the mixture at 150° to 260° C. and then polymerizing the mixture at 220° to 300° C. under high vacuum. This polyether-ester amide is excellent in the impact resistance and rubbery elasticity.

13 Claims, No Drawings

POLYETHER-ESTER AMIDE AND PROCESS FOR PREPARATION THEREOF

BACKGROUND OF THE INVENTION (1) Field of the Invention

The present invention relates to an improved segmented polyether-ester amide and a process for the preparation thereof. More particularly, the present invention relates to a segmented, colorless polyether-ester amide having a high degree of polymerization, which is obtained by using an aminocarboxylic acid, a poly(alkylene oxide) glycol and a dicarboxylic acid as the main starting materials, and a process for the preparation thereof.

(2) Description of the Prior Art:

Polyether-ester amides are known, and it also is known that polyether-ester amides have excellent impact resistance and elasticity just like polyether-esters and polyether-amides. However, polyether-ester amides contain in the main chain ester units which readily undergo hydrolysis and have a small equilibrium constant of polymerization (the equilibrium constant is ordinarily smaller than 1 and hence the speed of depolymerization is higher) and amide units which tend to cyclize under high vacuum because of thermal equilibrium and to dissociate and evaporate from the system and therefore often cause changes in the copolymerization ratio. Accordingly, to obtain a polymer having a high degree of polymerization, the copolymerization ratio and polymerization conditions are limited and they should be selected within narrow ranges. Furthermore, in polymers of the polyester amide type having ester units and amide units, there is a disadvantage in that a certain decomposition takes place concurrently with the intended polymerization reaction and the polymer is colored.

As the means for eliminating these drawbacks, there have been proposed improved polymerization processes for the preparation of polyether-ester amides. For example, there can be mentioned polymerization processes for the preparation of polyether-ester amides such as as those, disclosed in U.S. Pat. No. 4,230,838, U.S. Pat. No. 4,207,410 and Japanese Patent Application Laid-Open No. 47430/81. According to these processes, however, it is difficult to prepare uncolored polyether-ester amides having a high degree of polymerization industrially.

SUMMARY OF THE INVENTION

It is a primary object of the present invention to provide a polyether-ester amide having excellent physical properties, especially in its impact resistance and elasticity.

Another object of the present invention is to provide a process for preparing such a colorless polyether-ester amide with a high degree of polymerization industrially.

More specifically, in accordance with the present invention, there is provided a polyether-ester polyamide obtained by mixing an aminocarboxylic acid (A) having 6 to 20 carbon atoms, a poly(alkylene oxide) glycol (B) having a number average molecular weight of 300 to 6,000 and a dicarboxylic acid (C) having 4 to 20 carbon atoms at such a mixing ratio that the amount of the component (B) is 5 to 90% by weight based on the total amount of the mixture and the carboxyl, amino and hydroxyl groups of said components (A), (B) and (C) satisfy the following requirement:

$$0.95 \leq [COOH]/([NH_2]+[OH]) \leq 1.05$$

heating the mixture at a temperature of 150° to 260° C. and then polymerizing the mixture under high vacuum at a temperature of 220° to 300° C.

According to the present invention, there also is provided a process for the preparation of such polyether-ester amide.

DETAILED DESCRIPTION OF THE PREFERRED EMBODIMENTS

As the aminocarboxylic acid (A) having 6 to 20 carbon atoms those that can be utilized in the present invention, include, for example, $\epsilon$-aminocaproic acid, 10-aminodecanoic acid, 11-aminoundecanoic acid and 12-aminododecanoic acid; 11-aminoundecanoic acid and 12-aminododecanoic acid are especially preferred. Two or more of these aminocarboxylic acids may be used in combination according to the object and use of the polyether-ester amide. Furthermore, another amide-forming component may be used as a comonomer for reducing the melting point of the obtained polyether-ester amide or improving the adhesiveness thereof, so far as the amount of such component is small.

As the poly(alkylene oxide)glycol (B) having a number-average molecular weight of 300 to 6,000 those that can be utilized in the present invention, include, for example, polyethylene glycol, poly(1,2-propylene oxide) glycol, poly(1,3-propylene oxide)glycol, poly(tetramethylene oxide)glycol, poly(hexamethylene oxide)glycol, ethylene oxide/propylene oxide block or random copolymers and ethylene oxide/tetrahydrofuran block or random copolymers. In order to obtain a polyether-ester amide having excellent physical properties such as heat resistance, water resistance, mechanical strength and elastic recovery, it is preferred that poly(tetramethylene oxide) glycol be used as the component (B). The number-average molecular weight of the poly(alkylene oxide)glycol is in the range of from 300 to 6,000, and a molecular weight region not causing a phase separation of coarse masses at polymerization and giving excellent low-temperature characteristics and mechanical properties is selected. This optimum molecular weight region differs according to the kind of the poly(alkylene oxide)glycol used. For example, in case of polyethylene glycol, a molecular weight of 300 to 6,000 is preferred and a molecular weight of 1,000 to 4,000 is especially preferred, and in case of poly(propylene oxide) glycol, a molecular weight of 300 to 2,000 is preferred and a molecular weight of 500 to 1,200 is especially preferred. Furthermore, in case of poly(tetramethylene oxide)glycol, a molecular weight of 500 to 2,500 is preferred and a molecular weight of 500 to 1,500 is especially preferred.

As the dicarboxylic acid having 4 to 20 carbon atoms those that can be utilized as the other component in the present invention, include, for example, aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 5-sulfoisophthalic acid, alicyclic dicarboxylic acids such as 1,4-cyclohexanedicarboxylic acid, 1,2-cyclohexanedicarboxylic acid and dicyclohexyl-4,4'-dicarboxylic acid, and aliphatic dicarboxylic acids such as succinic acid, oxalic acid, adipic acid, sebacic acid and dodecanedioic acid (decanedicarboxylic acid). From the viewpoints of polymerizability, color and physical properties of the resulting polymer, terephthalic acid, isophthalic acid, 1,4-cyclohexanedicarboxylic acid, sebacic acid and dodecanedioic acid are especially preferred.

In the present invention, the foregoing three components, that is, the aminocarboxylic acid (A) having 6 to 20 carbon atoms, the poly(alkylene oxide)glycol (B) having a number-average molecular weight of 300 to 6,000 and the dicarboxylic acid (C) having 4 to 20 carbon atoms, are copolymerized. In the present invention, these components should be combined and copolymerized so that the amount of the poly(alkylene oxide)glycol units account for 5 to 90% by weight of the amount of the copolymer as a whole and the carboxyl, amino and hydroxyl groups of the components (A), (B) and (C) satisfy the following requirement:

$$0.95 \leq [COOH]/([NH_2]+[OH]) \leq 1.05$$

When the poly(alkylene oxide)glycol units are copolymerized in an amount of 5 to about 25% by weight based on the total copolymer, the resulting polyether-ester amide has a high mechanical strength, is excellent in chemical resistance characteristics such as oil resistance and chemical resistance and retains an excellent impact resistance even at low temperatures, and the obtained polymer has a modulus region corresponding to that of a soft plastic such as plasticized nylon. When the content of the poly(alkylene oxide)glycol units is lower than 5% by weight, the effects of improving the impact resistance and low temperature properties are not prominent. The polyether-ester amide in which the poly(alkylene oxide) glycol units are copolymerized in an amount of about 25 to about 75% by weight has physical properties inherent to a so-called thermoplastic elastomer, and it retains excellent elastomeric properties such as high resistance to permanent set and an appropriate and slight varying modulus in a broad temperature range from low to high temperatures. The polyether-ester amide in which the poly(alkylene oxide)glycol units are copolymerized in an amount of about 75 to 90% by weight is very soft and can be used as a modifying polymer imparting softness or impact resistance to different polymers. Furthermore, this polymer can be used solely as an adhesive or coating agent. If the content of the poly(alkylene oxide)glycol exceeds 90% by weight, the length of the hard amide blocks of the resulting polyether-ester amide is too short and the physical properties of the polymer are poor. At any rate, if the poly(alkylene oxide)glycol is copolymerized at the copolymerization ratio specified in the present invention, there is obtained a polyether-ester amide which is especially excellent in injection moldability.

In order to obtain a polyether-ester amide which has a high degree of polymerization, is colorless and has excellent physical properties, it is important that the aminocarboxylic acid (A), the poly(alkylene oxide)-glycol (B) and the dicarboxylic acid (C) should be combined and copolymerized so that the carboxyl, amino and hydroxyl groups of the three components (A), (B) and (C) satisfy the following requirement:

$$0.95 \leq [COOH]/([NH_2]+[OH]) \leq 1.05$$

If the ratio of the carboxyl, amino annd hydroxyl groups is outside the range defined by the above formula, coloration readily occurs during polymerization or at the aging step, and it is difficult to obtain a polymer having a high degree of polymerization.

The concentrations of the carboxyl, amino and hydroxyl groups mentioned above are values obtained according to the ordinary terminal group determination method, and the above formula means that the following relation should be established among the mole numbers of the respective comonomer components (A), (B) and (C):

$$0.95 \leq \frac{a+2c}{a+2b} \leq 1.05$$

wherein a stands for the mole number of the aminocarboxylic acid (A), b stands for the mole number of the poly(alkylene oxide)glycol (B) and c stands for the mole number of the dicarboxylic acid (C).

Another indispensable requirement of the present invention is that the aminocarboxylic acid (A), the poly(alkylene oxide)glycol (B) and the dicarboxylic acid (C) should be fed to a reaction zone at the abovementioned copolymerization ratio, heated at 150° to 260° C. and then polymerized under high vacuum at 220° to 300° C., more preferably 220°–280° C. Since the starting materials are ordinarily solid, though some poly(alkylene oxide)glycol is liquid, a homogeneous liquid mixture of the three components is prepared by heating the three components under atmospheric pressure with stirring at a temperature of 150° to 260° C., preferably 180° to 230° C., for about 10 to about 30 minutes. Then, vacuum is produced in the reaction zone and preferably the temperature is elevated and polymerization conditions of 220° to 300° C. under high vacuum are brought about over a period of about 20 to about 90 minutes. The term "high vacuum" as used in the instant specification and appended claims means a pressure lower than about 15 mmHg, preferably a pressure lower than 5 mmHg, most preferably a pressure lower than 1 mmHg. Namely, a reduced pressure customarily used for the melt polymerization for the production of polyesters.

In the polymerization reaction for formation of the polyether-ester amide of the present invention, there are preferably used titanium catalysts such as tetraalkyl titanates, e.g., tetrabutyl titanate and metallic titanium oxalates, e.g., potassium titanium oxalate, tin catalysts such as dibutyltin oxide, dibutyltin laurate and monobutyltin oxide, zirconium tetraalkoxide catalysts such as zirconium tetrabutoxide and zirconium isopropoxide, hafnium tetraalkoxide catalysts such as hafnium tetraethoxide, and lead catalysts such as lead acetate. These compounds act as polymerization catalysts promoting the reaction and are very valuable for easily preparing an uncolored polymer of the present invention having a high degree of polymerization and having excellent physical properties.

Polyfunctional compounds such as trimesic acid, glycerin and pentaerythritol may be contained in the polymerization reaction mixture in such amounts as not causing gelation. These polyfunctional compounds may be used as viscosity increasing agents, but if they are used as comonomers, their terminal groups should be considered in the above-mentioned formula and their amounts should be controlled so that the above requirement is satisfied.

Heat-resistant and light-resistant stabilizers such as antioxidants, thermal decomposition preventing agents and ultraviolet absorbers may be added to the polyether-ester amide block copolymer of the present invention during polymerization or after polymerization but before molding. As the heat-resistant stabilizer, those that can be utilized include, for example, hindered phenols such as 4,4'-bis(2,6-di-tert-butylphenol), 1,3,5-trimethyl-2,4,6-tris(3,5-di-tert-butyl-hydroxybenzyl)benzene, tetrakis[methylene3(3,5-di-tert-butyl-4-hydroxyphenyl)-propionato]methane and N,N'-hexamethylenebis(3,5-di-tert-butyl-4-hydroxyhydrocinnamamide), aromatic amines such as N,N'-bis($\beta$-naphthyl)-p-phenylenediamine and 4,4'-bis(4-$\alpha$,$\alpha$-dimethylbenzyl)diphenylamine, sulfur compounds such as dilauryl thiodipropionate, phosphorus compounds, alkaline earth metal oxides, nickel salts of Schiff bases, and cuprous iodide and/or potassium iodide. As the light-resistant stabilizer, those that can be utilized include, for example, substituted benzophenones, benzotriazoles and piperidine compounds such as bis(2,2,6,6-tetramethyl-4-piperidine)-sebacate and 4-beozoyloxy-2,2,6,6-tetramethylpiperidine.

Furthermore, hydrolytic stabilizers, colorants (pigments and dyes), antistatic agents, conducting agents, flame retardants, reinforcing materials, fillers, lubricants, nucleating agents, releasing agents, plasticizers, adhesive aids and tackifiers may optionally be incorporated into the polyether-ester amide block copolymer of the present invention according to need.

The present invention will now be described in detail with reference to the following Examples that by no means limit the scope of the invention. Incidentally, in these Examples, all of "parts" are by weight unless otherwise indicated.

EXAMPLE 1

In a reaction vessel provided with a helical ribbon stirring blade were charged 54.57 parts of $\omega$-aminododecanoic acid, 13.42 parts of dodecanedioic acid and 38.68 parts of poly(tetramethylene oxide)-glycol having a number-average molecular weight of 663 as determined by the terminal group determining method, together with 0.2 parts of Irganox 1098 [antioxidant supplied by Ciba-Geigy, Japan and composed of N,N'-hexamethylene-bis(3,5-di-tert-butyl-4-hydroxyhydrocinnamamide)] and 0.05 parts of a tetrabutyl titanate catalyst, and the reaction vessel was purged with $N_2$. The mixture was heated at 220° C. for 30 minutes with stirring to form a homogeneous transparent solution. Then, according to the program of elevation of the temperature and reduction of the pressure, polymerization conditions of a temperature of 250° C. and a pressure lower than 1 mmHg were produced over a period of 30 minutes. Under these polymerization conditions, reaction was conducted for 3 hours and 25 minutes to obtain a viscous, colorless, transparent, molten polymer having a stirring torque of 5.0 Kg-cm as determined at 22 rpm. When this polymer was extruded in water in the form of a strand, the polymer crystallized and whitened. The obtained polyether-ester amide was characterized by a relative viscosity ($\eta_{rel}$) of 1.87 as measured in o-chlorophenol at a temperature of 25° C. and a concentration of 0.5% and a crystal melting point (Tm) of 154° C. as determined according to DSC. (In the subsequent Examples, the values of $\eta_{rel}$ and Tm were determined according to the above methods.)

The mechanical properties determined with respect to a press-molded article of the above polymer are shown in Table 1. The molded article was soft and elastomeric.

TABLE 1

| Measurement Item | Measurement Method | Unit | Measured Value |
|---|---|---|---|
| Tensile modulus of elasticity | ASTM D-638 | Kg/cm$^2$ | 1,050 |
| 10% Tensile modulus | ASTM D-638 | Kg/cm$^2$ | 79 |
| 100% Tensile modulus | ASTM D-638 | Kg/cm$^2$ | 115 |
| Tensile Strength | ASTM D-638 | Kg/cm$^2$ | 550 |
| Elongation at break | ASTM D-638 | % | 700 |
| Shore D hardness | ASTM D-2240 | Shore D | 48 |
| Elastic recovery (50% elongation) | ASTM D-412 | % | 85 |

EXAMPLE 2

In Example 1, the terminal group concentration ratio [COOH]/([NH$_2$]+[OH]) was 1.00. In this Example, the influences of this terminal group concentration ratio on the polymerization reactivity were examined. The terminal group concentration was changed by changing the amount of dodecanedioic acid while keeping the amounts of $\omega$-aminododecanoic acid and poly(tetramethylene oxide)glycol having a number-average molecular weight of 663 constant. In this Example, the amounts of the catalyst and stabilizer used were the same as in Example 1. The conditions of heating and melting the starting materials and the program of the subsequent temperature elevation and pressure reduction for providing the polymerization conditions were similar to Example 1.

The obtained results are shown in Table 2. The polymerization was stopped when the stirring torque was 5 Kg-cm or the polymerization was conducted for 18 hours.

TABLE 2

| | Within Scope of Present Invention | | | | | Outside Scope of Present Invention | |
|---|---|---|---|---|---|---|---|
| Run No. | 1 | 2 | 3 | 4 | 5 | 6 | 7 |
| Starting Materials (parts) | | | | | | | |
| $\omega$-aminododecanoic acid | 54.57 | 54.57 | 54.57 | 54.57 | 54.57 | 54.57 | 54.57 |
| dodecanedioic acid | 15.55 | 14.48 | 13.42 | 12.35 | 11.29 | 17.67 | 9.16 |
| PTMG-663* | 38.68 | 38.68 | 38.68 | 38.68 | 38.68 | 38.68 | 38.68 |
| terminal group concentration ratio | 1.050 | 1.025 | 1.000 | 0.975 | 0.950 | 1.100 | 0.900 |
| Polymerization Conditions | | | | | | | |
| temperature (°C.) | 250 | 250 | 250 | 250 | 250 | 250 | 250 |
| pressure (mmHg) | 0.6 | 0.3 | 0.7 | 0.6 | 0.8 | 0.5 | 0.4 |
| time (hr:min) | 18:00 | 11:50 | 5:25 | 10:20 | 18:00 | 18:00 | 18:00 |
| torque (Kg-cm) | 3.0 | 5.0 | 5.0 | 5.0 | 1.2 | 0.8 | 0.5 |
| Properties of Polymer | | | | | | | |
| color (molten state) | light yellow | colorless | colorless | colorless | colorless | yellowish | light yellow |

TABLE 2-continued

|  | Within Scope of Present Invention | | | | Outside Scope of Present Invention | |
|---|---|---|---|---|---|---|
| Run No. | 1 | 2 | 3 | 4 | 5 | 6 | 7 |
|  |  | trans-parent | trans-parent | trans-parent | trans-parent | brown |  |
| $\eta_{rel}$ | 1.70 | 1.85 | 1.87 | 1.89 | 1.65 | 1.47 | 1.44 |

Note
*poly(tetramethylene oxide)glycol having a number-average molecular weight of 663

COMPARATIVE EXAMPLE 1

In this Comparative Example, it is demonstrated that under ordinary amide type polymerization conditions, a polymer having a high degree of polymerization and having excellent physical properties cannot be obtained and the obtained polymer is often colored.

The same starting material mixture as used in Example 1 was polymerized under conditions shown in Table 3. Each of the obtained polymers has a low degree of polymerization and was colored. It was found that a press sheet-punched test piece obtained from the polymer prepared in Run No. 4 had a tensile strength of only 80 Kg/cm² and an elongation at break of only 80%.

TABLE 3

| Run No. | 1 | 2 | 3 | 4 |
|---|---|---|---|---|
| Starting Materials (parts) |  |  |  |  |
| ω-aminododecanoic acid | 54.57 | 54.57 | 54.57 | 54.57 |
| dodecanedioic acid | 13.42 | 13.42 | 13.42 | 13.42 |
| PTMG-663 | 38.68 | 38.68 | 38.68 | 38.68 |
| Irganox 1098 | 0.20 | 0.20 | 0.20 | 0.20 |
| tetrabutyl titanate | 0.05 | — | — | 0.05 |
| H₃PO₄ | — | 0.03 | 0.03 | — |
| water | — | — | 10 | — |
| Polymerization Conditions |  |  |  |  |
| temperature-and pressure-elevating time (hr:min) | 1:20 | 1:30 | 1:20 | — |
| pressure control |  |  |  |  |
| temperature (°C.) | 240 | 230 | 240 | — |
| pressure (Kg/cm²) | 17 | 11 | 17 | — |
| time (hr:min) | 1:00 | 0:50 | 1:00 | — |
| pressure releasing time (hr:min) | 1:20 | 0:40 | 1:20 | — |
| atmospheric reaction |  |  |  |  |
| temperature (°C.) | 270 | 260 | 270 | 250 |
| time (hr:min) | 6:00 | 3:00 | 6:00 | 6:00* |
| reduced pressure reaction |  |  |  |  |
| temperature (°C.) | — | 260 | — | 250 |
| pressure (mmHg) | — | 400 | — | 300 |
| time (hr:min) | — | 3:00 | — | 12:00 |
| total polymerization time (hr:min) | 9:40 | 9:00 | 9:40 | 18:00 |
| Properties of Polymer |  |  |  |  |
| color | brown | yellowish brown | yellowish brown | yellowish brown |
| $\eta_{rel}$ | 1.28 | 1.33 | 1.32 | 1.35 |

Note
*torque smaller than 0.5 Kg-cm and $\eta_{rel}$ of 1.20 at this stage

EXAMPLE 3

In this Example, the copolymerization ratio shown in Example 1 was changed, and the polymerization reactivity and physical properties of the resulting polyether-ester amide were examined. The polymerization was carried out in the same manner as described in Example 1 except that the charge ratio of the starting materials was changed as shown in Table 4. The obtained results are shown in Table 4.

TABLE 4

| Run No. | 1 | 2 | 3 |
|---|---|---|---|
| Starting Materials |  |  |  |
| ω-aminododecanoic acid (parts) | 81.85 | 65.48 | 43.65 |
| dodecanedioic acid (parts) | 6.71 | 10.74 | 16.10 |
| PTMG-663 (parts) | 19.34 | 30.95 | 46.42 |
| terminal group concentration ratio | 1.00 | 1.00 | 1.00 |
| copolymerization ratio (hard/soft)* | 75/25 | 60/40 | 40/60 |
| Polymerization Conditions |  |  |  |
| temperature (°C.) | 250 | 248 | 253 |
| pressure (mmHg) | 0.7 | 0.7 | 0.7 |
| time (hr:min) | 5:10 | 6:35 | 5:25 |
| Torque at 22 rpm (Kg-cm) | 5.0 | 5.0 | 5.0 |
| Properties of Polymer |  |  |  |
| color (molten state) | colorless transparent | colorless transparent | colorless transparent |
| $\eta_{rel}$ | 1.68 | 1.77 | 1.99 |
| Tm (°C.) | 171.5 | 162.5 | 143 |
| Mechanical Properties** |  |  |  |
| tensile modulus of elasticity (Kg/cm²) | 2280 | 1570 | 720 |
| 10% tensile modulus (Kg/cm²) | 162 | 112 | 54 |
| 100% tensile modulus (Kg/cm²) | 193 | 146 | 89 |
| tensile strength (Kg/cm²) | 620 | 560 | 480 |
| elongation at break (%) | 500 | 600 | 800 |
| Shore D hardness | 58 | 51 | 45 |
| elastic recovery (%) | 51 | 68 | 93 |

Note
*polydodecanamide/poly(polytetramethyl oxide glycol)dodecanoate
**measured with respect to specimens punched out from 1 mm press sheet

EXAMPLE 4

A reaction vessel was charged with 65.902 parts of ω-aminoundecanoic acid, 10.741 parts of dodecanedioic acid and 30.962 parts of PTMG-663 together with 0.2 part of Irganox 1098 (trademark) and 0.05 part of tetrabutyl titanate, and the mixture was heated at 220° C. for 15 minutes with stirring to form a solution. The temperature was elevated to 252° C. over a period of 30 minutes while reducing the pressure to high vacuum. Then, polymerization was conducted under conditions of a temperature of 250° C. and a pressure of 0.3 mmHg for 6 hours to afford a colorless, transparent and viscous polymer. In the obtained polyether-ester amide, the hard/soft copolymerization ratio was 60/40, and the polymer had the following physical properties.

| Tm: | 167.0° C. |
|---|---|
| Tc (crystallization temperature): | 137.0° C. |
| $\eta_{rel}$: | 1.75 |
| Tensile modulus: | 1470 Kg/cm² |
| 10% modulus: | 99 Kg/cm² |
| 100% modulus: | 155 Kg/cm² |
| Tensile Strength: | 620 Kg/cm² |
| Elongation at break: | 600% |
| Shore D hardness: | 50 D |

COMPARATIVE EXAMPLE 2

Polymerization was carried out in the same manner as described in Example 4 except that hexamethylenediammonium adipate was used instead of ω-aminoundecanoic acid used in Example 4. With advance of the polymerization, there were formed coarse masses of the separated phase, and coloration became vigorous with the lapse of time. A polymer having a high degree of polymerization was not obtained.

EXAMPLE 5

In this Example, polyether-ester amides were prepared in the same manner as described in Example 1 by using various poly(tetramethylene oxide)glycols differing in the number-average molecular weight. The polymerization conditions and the physical properties of the obtained polymers are shown in Table 5. In each run, the terminal group concentration ratio in the starting materials was 1.00 and the hard/soft ratio was 60/40.

TABLE 5

| Run No. | 1 | 2 | 3 | 4 |
|---|---|---|---|---|
| Molecular Weight of PTMG | 663 | 800 | 1089 | 2005 |
| Starting Materials (parts) | | | | |
| ω-aminododecanoic acid | 65.48 | 65.48 | 65.48 | 65.48 |
| dodecanedioic acid | 10.74 | 9.255 | 7.171 | 4.195 |
| PTMG | 30.95 | 32.19 | 33.96 | 36.48 |
| Polymerization Conditions | | | | |
| temperature (°C.) | 245 | 245 | 245 | 245 |
| pressure (mmHg) | 0.7 | 0.5 | 0.5 | 0.6 |
| time (hr:min) | 6:00 | 3:00 | 5:00 | 6:45 |
| torque (Kg-cm) | 5.0 | 5.0 | 5.0 | 4.3 |
| Properties of Polymer | | | | |
| color, appearance (melt) | colorless transparent | colorless translucent | colorless translucent | white, opaque |
| $\eta_{rel}$ | 1.77 | 1.69 | 1.77 | 1.67 |
| Tm (°C.) | 162.5 | 164 | 168 | 175 |
| Mechanical Properties | | | | |
| tensile modulus (Kg/cm$^2$) | 1570 | 1580 | 1570 | 1520 |
| 10% modulus (Kg/cm$^2$) | 112 | 109 | 107 | 103 |
| 100% modulus (Kg/cm$^2$) | 146 | 137 | 138 | 137 |
| tensile strength (Kg/cm$^2$) | 560 | 490 | 450 | 330 |
| elongation at break (%) | 600 | 580 | 510 | 430 |

EXAMPLE 6

Polymerization was carried out in the same manner as described in Example 1 by using 86.00 parts of ω-aminododecanoic acid, 11.55 parts of terephthalic acid and 69.46 parts of poly(tetramethylene oxide)glycol having a number-average molecular weight of 998 as the starting materials. The obtained results are shown in Table 6.

EXAMPLE 7

Polymerization was carried out in the same manner as described in Example 1 by using 86.00 parts of ω-aminododecanoic acid, 12.11 parts of sebacic acid and 69.46 parts of poly(tetramethylene oxide)glycol having a number-average molecular weight of 998 as the starting materials. The obtained results are shown in Table 6.

EXAMPLE 8

Polymerization was carried out in the same manner as described in Example 1 by using 86.00 parts of ω-aminododecanoic acid, 2.75 parts of adipic acid and 69.46 parts of polyethylene glycol having a number-average molecular weight of 3985 as the starting materials. The obtained results are shown in Table 6.

TABLE 6

| Example No. | 6 | 7 | 8 |
|---|---|---|---|
| Polymerization Conditions | | | |
| temperature (°C.) | 250 | 252 | 245 |
| pressure (mmHg) | 0.3 | 0.6 | 0.4 |
| time (hr:min) | 18:00 | 7:20 | 10:00 |
| torque (Kg-cm) | 4.3 | 5.0 | 3.5 |
| Properties of Polymer | | | |
| color, appearance (melt) | colorless translucent | colorless translucent | light yellow, transparent |
| $\eta_{rel}$ | 1.79 | 1.89 | 1.71 |
| Tm (°C.) | 158 | 156 | 165 |
| Mechanical Properties | | | |
| tensile modulus (Kg/cm$^2$) | 1300 | 1100 | 1050 |
| 10% modulus (Kg/cm$^2$) | 100 | 80 | 75 |
| 100% modulus (Kg/cm$^2$) | 150 | 120 | 105 |
| tensile strength (Kg/cm$^2$) | 420 | 480 | 390 |
| elongation at break (%) | 380 | 560 | 620 |

EXAMPLE 9

In this Example, ε-aminocaproic acid and terephthalic acid were used as the starting materials and they were copolymerized with poly(tetramethylene oxide)glycol. In this polymerization system, some problem arose. For example, if the amount of the nylon 6 component was large, the reaction mixture was emulsified and a part of the nylon 6 component was converted to ε-caprolactam and distilled off from the polymerization reaction mixture. However, a polyether-ester amide block copolymer having a high melting point and having excellent elastic recovery was obtained. The polymerization conditions and the physical properties of the obtained polymer are shown in Table 7.

TABLE 7

| Run No. | 1 | 2 |
|---|---|---|
| Starting Materials | | |
| ε-aminocaproic acid (parts) | 69.6 | 46.4 |
| terephthalic acid (parts) | 8.37 | 12.6 |
| PTMG-663 (parts) | 33.4 | 50.2 |
| terminal group concentration ratio | 1.00 | 1.00 |
| copolymerization ratio (hard/soft ratio) | | |
| in the charge | 60/40 | 40/60 |
| in the polymer | 55/45 | 38/62 |
| Polymerization Conditions | | |
| temperature (°C.) | 250 | 250 |
| pressure (mmHg) | 0.45 | 0.50 |
| time (hr:min) | 6:00 | 7:15 |
| torque at 22 rpm (Kg-cm) | 5.0 | 5.0 |
| Properties of Polymer | | |
| color (molten state) | white, opaque | colorless, transparent |
| $\eta_{rel}$ | 1.82 | 2.10 |
| Tm (°C.) | 203 | 192 |
| Mechanical Properties | | |
| tensile modulus (Kg/cm$^2$) | 2050 | 1030 |
| 10% modulus (Kg/cm$^2$) | 135 | 74 |
| tensile strength (Kg/cm$^2$) | 430 | 410 |
| elongation at break (%) | 360 | 450 |
| Shore D hardness | 54 | 46 |
| elastic recovery (%) | 75 | 95 |

What is claimed is:

1. A polyether-ester amide obtained by mixing an aminocarboxylic acid (A) having 6 to 20 carbon atoms, a poly(alkylene oxide)glycol (B) having a number-average molecular weight of 300 to 6,000 and a dicarboxylic acid (C) having 4 to 20 carbon atoms, heating the mixture without the addition of water, under normal pressure at 150° to 260° C. and then polymerizing the mixture at 220° to 300° C. under high vacuum, wherein the amino, carboxyl and hydroxyl groups in the mixture of the components (A), (B) and (C) satisfy the following requirement:

$$0.95 \leq [COOH]/([NH_2]+[OH]) \leq 1.05$$

and the amount of the component (B) is 5 to 90% by weight based on the total amount.

2. A polyether-ester amide as set forth in claim 1, wherein the aminocarboxylic acid has 10 to 12 carbon atoms.

3. A polyether-ester amide as set forth in claim 1, wherein the number-average molecular weight of the poly(alkylene oxide)glycol is 1,000 to 4,000.

4. A polyether-ester amide as set forth in claim 1, wherein the number-average molecular weight of the poly(alkylene oxide) glycol is 500 to 1,500.

5. A polyether-ester amide as set forth in claim 1, wherein the amount of the component (B) is 5 to 25% by weight based on the total amount.

6. A polyether-ester amide as set forth in claim 1, wherein the amount of the component (B) is 25 to 75% by weight based on the total amount.

7. A polyether-ester amide as set forth in claim 1, wherein the amount of the component (B) is 75 to 90% by weight based on the total amount.

8. A polyether-ester amide as set forth in claim 1, wherein the heating temperature is 180° to 230° C.

9. A polyether-ester amide as set forth in claim 1, wherein the polymerization temperature is 220° to 280° C.

10. A polyether-ester amide as set forth in claim 1, wherein the high vacuum is an atmosphere maintained under a pressure lower than about 15 mmHg.

11. A polyether-ester amide as set forth in claim 1, wherein the high vacuum is an atmosphere maintained under a pressure lower than about 5 mmHg.

12. A polyether-ester amide as set forth in claim 1, wherein the aminocarboxylic acid has 10 or 11 carbon atoms, the poly(alkylene oxide)glycol is poly(tetramethylene oxide)glycol and the dicarboxylic acid is terephthalic acid.

13. A process for the preparation of polyether-ester amides, which comprises mixing an aminocarboxylic acid (A) having 6 to 20 carbon atoms, a poly(alkylene oxide)glycol (B) having a number-average molecular weight of 300 to 6,000 and a dicarboxylic acid (C) having 4 to 20 carbon atoms, heating the mixture without the addition of water, under normal pressure at 150° to 260° C. and then polymerizing the mixture at 220° to 300° C. under high vacuum, wherein the amino, carboxyl and hydroxyl groups in the mixture of the components (A), (B) and (C) satisfy the following requirement:

$$0.95 \leq [COOH]/([NH_2]+[OH]) \leq 1.05$$

and the amount of the component (B) is 5 to 90% by weight based on the total amount.

* * * * *